(12) United States Patent
Bussiere et al.

(10) Patent No.: US 12,544,997 B2
(45) Date of Patent: Feb. 10, 2026

(54) APPARATUS FOR FILM REMOVAL

(71) Applicant: ESSILOR INTERNATIONAL, Charenton-le-Pont (FR)

(72) Inventors: Paul Bussiere, Charenton-le-Pont (FR); Matthew Dieringer, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 426 days.

(21) Appl. No.: 18/267,560

(22) PCT Filed: Dec. 14, 2021

(86) PCT No.: PCT/EP2021/085687
§ 371 (c)(1),
(2) Date: Jun. 15, 2023

(87) PCT Pub. No.: WO2022/129046
PCT Pub. Date: Jun. 23, 2022

(65) Prior Publication Data
US 2024/0051078 A1    Feb. 15, 2024

(30) Foreign Application Priority Data
Dec. 18, 2020   (EP) .................................... 20306610

(51) Int. Cl.
*B29D 11/00* (2006.01)
*B24B 9/14* (2006.01)
(Continued)

(52) U.S. Cl.
CPC .............. *B29D 11/00* (2013.01); *B24B 9/146* (2013.01); *B24B 41/061* (2013.01); *B24B 9/065* (2013.01)

(58) Field of Classification Search
CPC ......... B29D 11/00; B24B 9/146; B24B 9/065; B24B 9/14
See application file for complete search history.

(56) References Cited

U.S. PATENT DOCUMENTS

2020/0130126 A1* 4/2020 Schneider ........ B29D 11/00009

FOREIGN PATENT DOCUMENTS

| EP | 2042265 | | 4/2009 | |
| EP | 2042265 A1 * | | 4/2009 | ......... B24B 13/0057 |
| JP | H1120035 | | 1/1999 | |

OTHER PUBLICATIONS

International Search Report issued in corresponding PCT Application No. PCT/EP2021/085687, mailed Feb. 23, 2022.

* cited by examiner

*Primary Examiner* — Jason L Vaughan
*Assistant Examiner* — Amanda Kreiling
(74) *Attorney, Agent, or Firm* — Norton Rose Fulbright US LLP

(57) ABSTRACT

An apparatus for separating a first liner from a lens wafer includes: at least one air nozzle including a first open end facing an edge of the lens wafer and configured to eject a gas, the at least one air nozzle disposed proximal to a first lens wafer holder configured to hold the lens wafer having the first liner attached to a first surface of the lens wafer, a first peeling device including a second lens wafer holder configured to hold the lens wafer, a first auxiliary air nozzle facing the lens wafer and including a first opening configured to eject a gas, and a first at least one suction cup configured to contact the first liner on the first surface of the lens wafer and form a vacuum seal with the first liner, each suction cup of the first at least one suction cup being retractable in a direction away from the lens wafer.

15 Claims, 5 Drawing Sheets

(51) Int. Cl.
*B24B 41/06* (2012.01)
*B24B 9/06* (2006.01)

APPARATUS FOR FILM REMOVAL

CROSS-REFERENCE TO RELATED APPLICATIONS

This application is a national phase application under 35 U.S.C. § 371 of International Application No. PCT/EP2021/085687 filed 14 Dec. 2021, which claims priority to European Patent Application No. 20306610.5 filed 18 Dec. 2020. The entire contents of each of the above-referenced disclosures is specifically incorporated by reference herein without disclaimer.

FIELD

The present disclosure relates to an automated peel and clean apparatus used in a manufacturing production environment for flat or curved substrates.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the manufacture of curved lenses, the lens wafer substrates include a film or liner to protect surfaces on the lens wafer during fabrication. The peeling and cleaning process can be performed via a manual operation that is labor intensive and not ergonomically efficient. The peeling and cleaning of the lens wafer prevents molding defects and unnecessary downtime associated with having to clean the inserts if contaminates from improper cleaning of the lens wafers create repeating defects. Currently there is no automated process.

Thus, an automated film peeler and substrate edge cleaner is desired in the field of lens fabrication to have a consistent cosmetic quality of lens wafers, reduce manual labor investment, and improve efficiency, ergonomics, and productivity. Cost savings can result due to labor reduction in the peeling and cleaning process as well.

Aspects of the disclosure may address some of the above-described shortcomings in the art, particularly with the solutions set forth in the claims.

SUMMARY

The present disclosure relates to an apparatus for separating a first liner from a lens wafer, including: at least one air nozzle including a first open end facing an edge of the lens wafer and configured to eject a gas, the at least one air nozzle disposed proximal to a first lens wafer holder configured to hold the lens wafer having the first liner attached to a first surface of the lens wafer, and a first peeling device including a second lens wafer holder configured to hold the lens wafer, a first auxiliary air nozzle facing the lens wafer and including a first opening configured to eject a gas, and a first at least one suction cup configured to contact the first liner on the first surface of the lens wafer and form a vacuum seal with the first liner, each suction cup of the first at least one suction cup being retractable in a direction away from the lens wafer.

The apparatus further includes a burnishing device including a burnishing pin configured to abut an edge of the lens wafer and loose the first liner on the first surface of the lens wafer and a transfer arm configured to move the lens wafer from the first lens wafer holder to the second lens wafer holder.

The apparatus further includes an edge brusher device disposed proximal to the first lens wafer holder, the edge brusher device including at least one brush wheel and a motor configured to rotate the at least one brush wheel, the at least one brush wheel configured to abut the edge of the lens wafer.

The apparatus further includes a second peeling device including a third lens wafer holder to hold the lens wafer, a second auxiliary air nozzle facing the lens wafer and including a first opening configured to eject a gas, and a second at least one suction cup configured to contact a second liner on a second surface of the lens wafer and form a vacuum seal with the second liner, each suction cup of the second at least one suction cup being retractable in a direction away from the lens wafer.

The apparatus further includes a fourth lens wafer holder and a de-static air nozzle disposed proximal to the fourth lens wafer holder and including a first open end facing the lens wafer and configured to eject a de-static gas, the de-static gas configured to remove a static charge from the lens wafer.

Note that this summary section does not specify every feature and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

The invention relates to an apparatus as claimed in claims 1 to 14 and to a method as claimed in claim 15.

BRIEF DESCRIPTION OF THE DRAWINGS

Various embodiments of this disclosure that are proposed as examples will be described in detail with reference to the following figures, wherein.

DETAILED DESCRIPTION

Figure 1A:
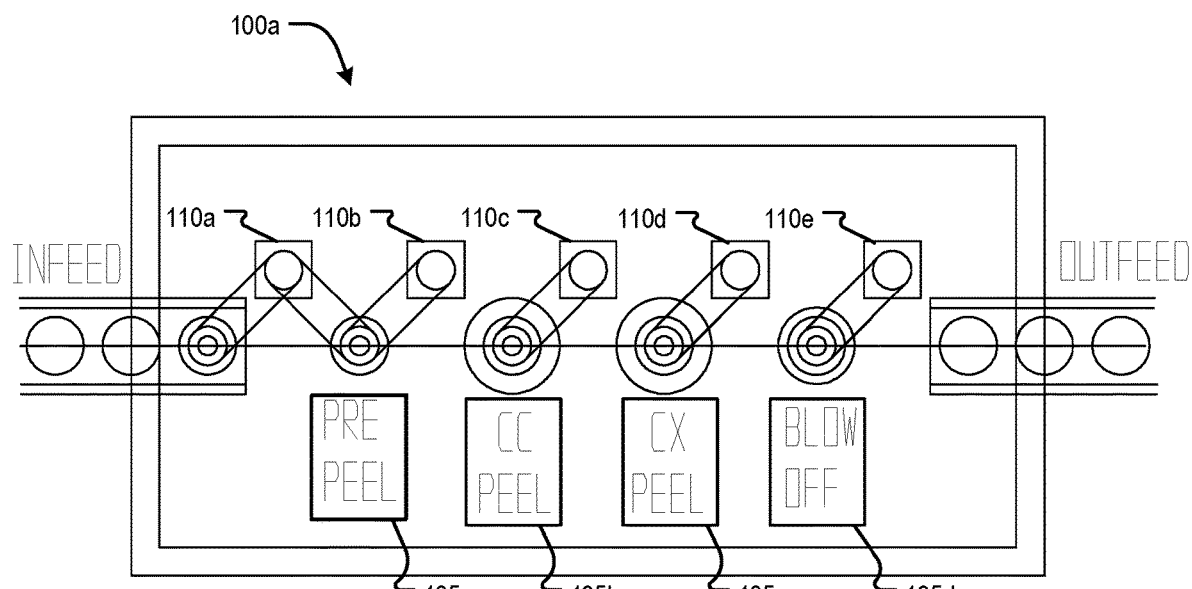
FIG. 1A is a schematic of an in-line peeler and cleaner apparatus, within the scope of the present disclosure.

The following disclosure provides many different variations, or examples, for implementing different features of the provided subject matter. Specific examples of components and arrangements are described below to simplify the present disclosure. These are, of course, merely examples and are not intended to be limiting nor inoperable together in any permutation. Unless indicated otherwise, the features and embodiments described herein are operable together in any permutation. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. Inventive apparatuses may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Combinations of modules for an automated liner peeler and cleaner apparatus are described herein. The modules can be configured to aid in the peeling of the film, or perform the peeling of the film from the curved lens wafer. Notably, the modules can include devices to help peel the liner without contact and maintain cleanliness of the lens wafer surface during any of the operations.

FIG. 1A shows an exemplary schematic of an exemplary in-line peeler and cleaner apparatus 100a (herein referred to as "the in-line apparatus 100a"), useful within the scope of the present disclosure. The in-line apparatus 100a can include a plurality of modules 105 for processing a wafer for a curved lens. The plurality of modules 105 can include a first module 105a, a second module 105b, a third module 105c, and a fourth module 105d. Additional or fewer modules 105 can be contemplated, as described herein. The lens wafer can be provided to the in-line apparatus 100a via an infeed mechanism, such as a conveyor belt. The lens wafer as described herein can be flat or include a base curve, be fully circular or truncated, and include different liners comprised of varying materials and having various thicknesses.

As shown in FIG. 1A, in a non-limiting example, a useful arrangement for the in-line apparatus 100a can be an in-line process flow and include a plurality of transfer arms 110 disposed adjacent to one another along a first direction. The plurality of transfer arms 110 can be configured to progress the lens wafer through each of the modules 105 in the first direction. As shown, a first transfer arm 110a can receive the lens wafer from the infeed mechanism and move the lens wafer to the first module 105a. A second transfer arm 110b can move the lens wafer from the first module 105a to the second module 105b. A third transfer arm 110c can move the lens wafer from the second module 105b to the third module 105c. A fourth transfer arm 110d can move the lens wafer from the third module 105c to the fourth module 105d. A fifth transfer arm 110e can move the lens wafer from the fourth module 105d to an outfeed mechanism. Notably, the transfer arms 110 can progress all lens wafers at the same time upon completion of processes at each of the modules 105.

Figure 1B:
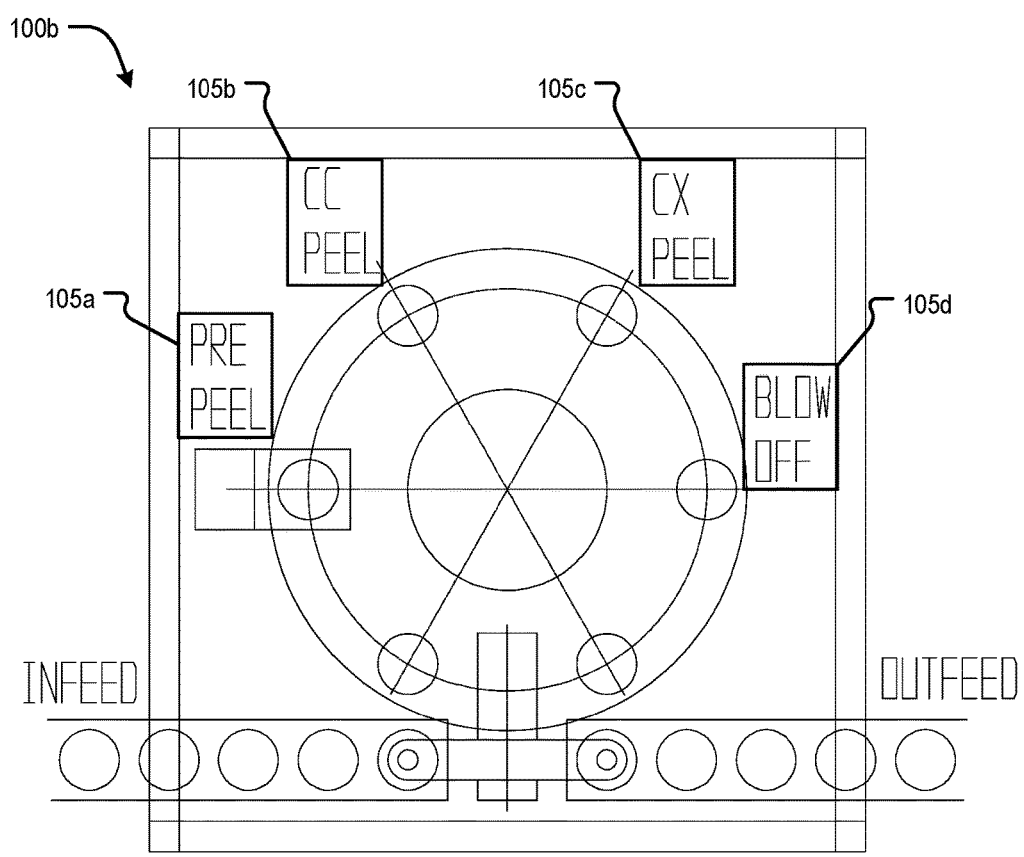
FIG. 1B is a schematic of a rotary peeler and cleaner apparatus, within the scope of the present disclosure.

FIG. 1B shows an exemplary schematic of an exemplary rotary peeler and cleaner apparatus 100b (herein referred to as "the rotary apparatus 100b"), useful within the scope of the present disclosure. The rotary apparatus 100b can include the plurality of modules 105 for processing the lens wafer, similarly to the in-line apparatus 100a. As shown in FIG. 1B, a useful arrangement for the rotary apparatus 100b can be a rotary process flow and include the plurality of transfer arms 110 disposed proximal to the infeed mechanism and the outfeed mechanism. In such a manner, the first transfer arm 110a can move the lens wafer from the infeed mechanism onto a rotating stage including a plurality of positions corresponding to the number of modules 105 in the rotary apparatus 100b. For example, the rotary apparatus 100b includes the first module 105a, the second module 105b, the third module 105c, and the fourth module 105d. Thus, the rotating stage includes a position for each of the modules 105, as well as a loading position and an unloading position, for a total of six positions (as shown). The first position can move the lens wafer from the infeed mechanism onto to loading position proximal to the first transfer arm 110a. When each module of the plurality of modules 105 has completed its process, the rotating stage can rotate to progress the lens wafer in each position to the next position. For example, the lens wafer in the loading position can progress to the first position proximal to the first module 105a. Upon completion of the process at the first module 105a (and all other processes at respective modules), the rotating stage can rotate and progress the lens wafer from the first position to a second position proximal to the second module 105b. This can continue until the lens wafer is progressed to the unloading position, where the second transfer arm 105b, disposed proximal to the unloading position, can remove the lens wafer from the rotating stage and move the lens wafer onto the outfeed mechanism.

Each module of the plurality modules 105 can be configured to execute a useful process. As previously described, the lens wafer can include a first liner removably attached to a first surface of the lens wafer and a second liner removably attached to a second surface of the lens wafer. In a non-limiting example, the first module 105a can be configured to loosen the attachment of the first liner and the second liner from the first surface and the second surface of the lens wafer. The first module 105a can further be configured to clean an edge of the lens wafer as well. The second module 105b can be configured to remove the first liner from the first surface of the lens wafer, wherein the lens wafer is curved and includes a concavity, the first surface of the lens wafer being concave. The third module 105c can be configured to remove the second liner from the second surface of the lens wafer, wherein the second surface of the lens wafer is convex. The fourth module 105d can be configured to blow a gas over the lens wafer to reduce a static charge on the lens wafer. The lens wafer can be processed in a horizontal plane with vacuum chucks and retracting peeling suction cups in a vertical plane. Additional details are described herein.

Figure 2A:
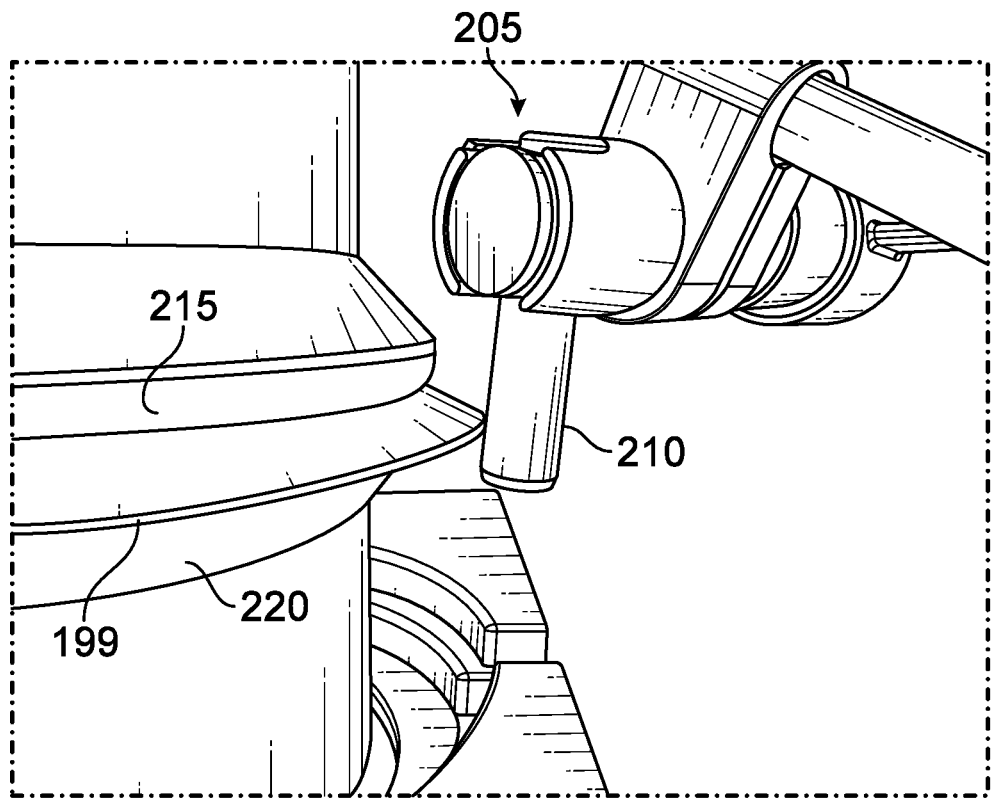
FIG. 2A is a schematic of a burnishing device, within the scope of the present disclosure.

FIG. 2A shows an exemplary schematic of an exemplary burnishing device 205, useful within the scope of the present disclosure. In a useful arrangement, the first module 105a can include the burnishing device 205. The burnishing device 205 can include a burnishing pin 210. A lens wafer 199 can be held in place by a first cup 215 and a second cup 220, wherein the lens wafer 199 is oriented such that a plane of the lens wafer 199 is in the horizontal plane. Once clamped, the lens wafer 199 rotates while a burnishing operation occurs in which the burnishing pin 210 is oriented perpendicular to the plane of the lens wafer 199 along the edge of the lens wafer 199 and moved to contact the edge of the lens wafer 199 with a spring loaded force. The burnishing pin 210 is configured to break the first liner and the second liner from the first surface and the second surface edge perimeters so that an air blast can penetrate between both liners and the lens wafer 199. The burnishing pin 210 can also cut off loose strings of the liners at the sharp edge corners of the lens wafer 199, and wipes strings off the lens wafer 199 edge face. A strong localized vacuum nozzle encompassing the burnishing pin 210 to lens wafer interface can remove the dislodged strings and other particles. In one useful setting, a force of the burnishing pin 210 against the lens wafer 199 can be, for example, 0.1 to 5 pounds, or 0.2 to 4 pounds, or 0.25 to 2 pounds.

Figure 2B:
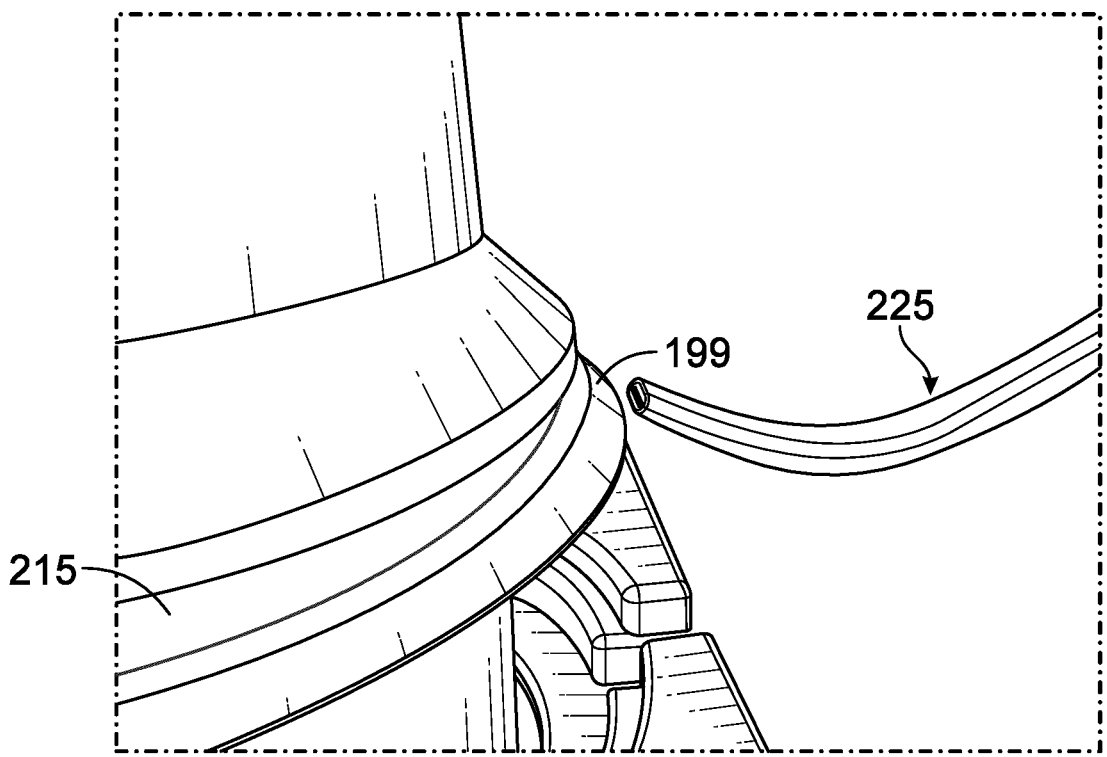
FIG. 2B is a schematic of an air nozzle, within the scope of the present disclosure.

FIG. 2B shows an exemplary schematic of an exemplary air nozzle 225, useful within the scope of the present disclosure. The air nozzle 225 can include an opening shaped like a slit to form an "air blade." The air nozzle 225 can be configured to oscillate in multiple directions. For example, the air nozzle 225 can be configured to oscillate in the vertical plane, and when directed at the edge of the lens wafer 199, the air nozzle 225 can expel air (or any gas) across the first surface and the second surface of the lens wafer 199 in an oscillating manner. In a useful arrangement, the first module 105a can include the air nozzle 225 disposed at a position spaced apart from the burnishing device 205. For example, the air nozzle 225 can be disposed adjacent to the burnishing device 205. In another example, the air nozzle 225 can be disposed on an opposite side of the lens wafer 199 from the burnishing device 205. The oscillating air blow process can simultaneously occur with the burnishing process of the burnishing device 205, wherein the intermittent air impingement penetrates between the lens wafer 199 and the first liner, and between the lens wafer 199 and the second liner. The oscillating air impingement can peel the liners back to the point of the first cup 215 and the second cup 220 clamped on the lens wafer 199. In one useful setting, an airflow of the air nozzle 225 can be, for example, 5 to 100 CFM at 90 PSI, or 7 to 75 CFM at 90 PSI, or 9 to 60 CFM at 90 PSI, or 10 to 50 PSI at 90 PSI from a 1 mm wide by 5 mm long nozzle slot of the air nozzle 225.

Figure 2C:
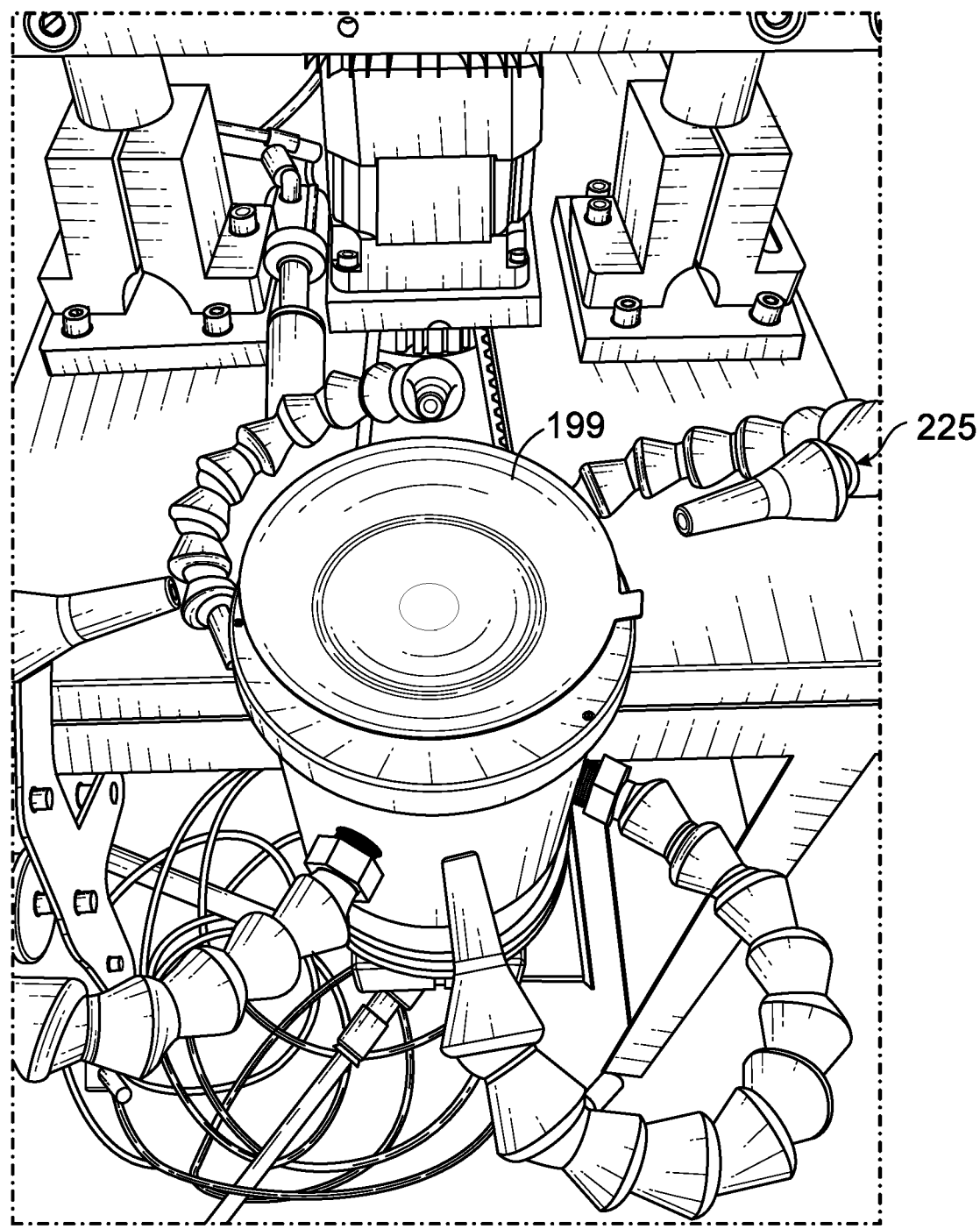
FIG. 2C is a schematic of multiple air nozzles, within the scope of the present disclosure.

FIG. 2C shows an exemplary schematic of multiple exemplary air nozzle 225, useful within the scope of the present disclosure. It may be appreciated that more than one of the air nozzle 225 can flank the edge of the lens wafer 199. In one example, the first module 105a can include four of the air nozzles 225. The four air nozzles 225 can be fixed in place proximal to the lens wafer 199 and with a fixed angle. The air nozzles 225 can be arranged facing the lens wafer 199 and oriented at an angle above and below a plane of the lens wafer surface at the edge of the lens wafer 199. The angle can be between, for example, 1 and 60 degrees, or 5 and 50 degrees, or 10 and 40 degrees, or 15 and 30 degrees, or 24 and 26 degrees. For example, the first air nozzle is oriented at an angle between 15 and 35 degrees above the plane of the lens wafer 199 surface at the edge of the lens wafer 199, the second air nozzle is oriented at an angle between 15 and 35 degrees below the plane of the lens wafer 199 surface at the edge of the lens wafer 199, the third air nozzle is oriented at an angle between 15 and 35 degrees above the plane of the lens wafer 199 surface at the edge of the lens wafer 199, and the fourth air nozzle is oriented at an angle between 15 and 35 degrees below the plane of the lens wafer 199 surface at the edge of the lens wafer 199. In a useful arrangement, the first air nozzle and the third air nozzle can be disposed on opposite sides of the lens wafer 199, and the second air nozzle and the fourth air nozzle can disposed on opposite sides of the lens wafer 199. The four air nozzles 225 can be spaced equally apart around the lens wafer 199 with the burnishing device 205 and the edge brusher device 230 (see below) interspersed between the four air nozzles 225.

Figure 2D:
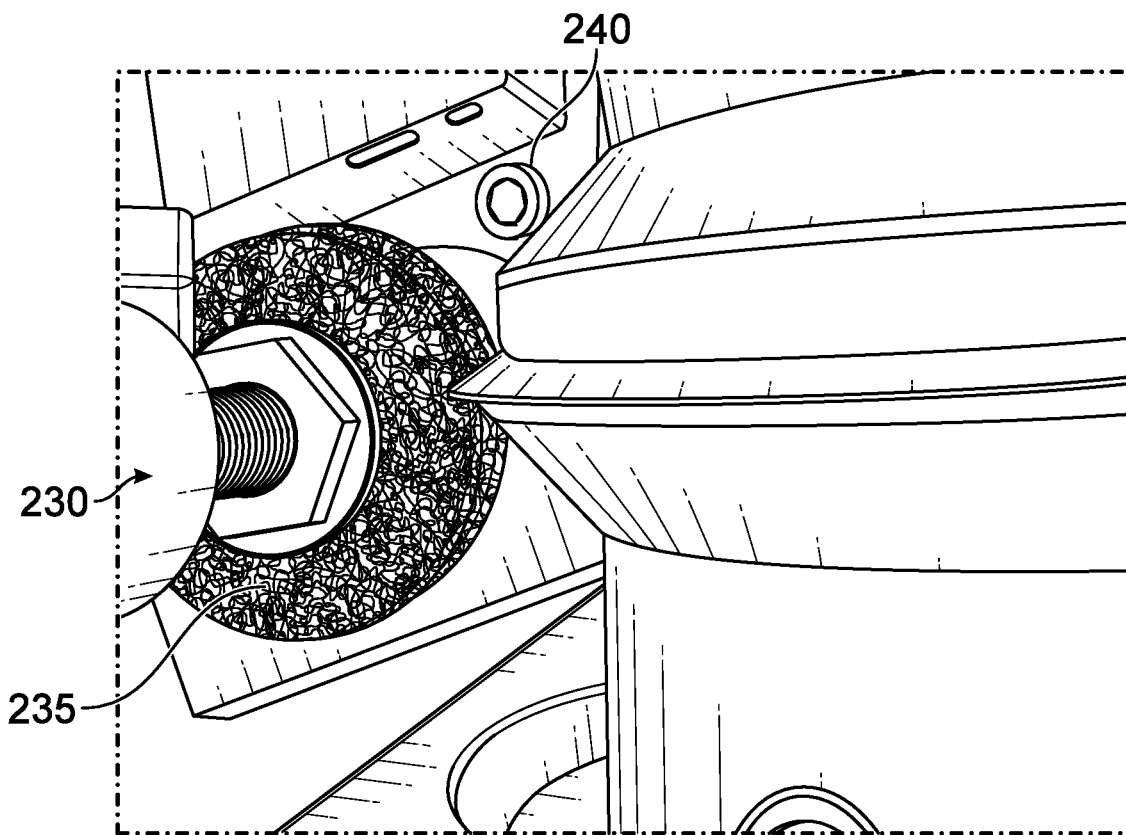
FIG. 2D is a schematic of an edge brusher device, within the scope of the present disclosure.

FIG. 2D shows an exemplary schematic of an exemplary edge brusher device 230, useful within the scope of the present disclosure. The edge brusher device 230 can include a brush wheel 235 attached to a motor configured to rotate the brush wheel 235. The edge brusher device 230 can be configured, designed or programmed to rotate the brush wheel 235 in a first direction while the brush wheel 235 is moved into contact with the lens wafer 199. The brush wheel 235 can further assist separation and loosening of the films from the surfaces of the lens wafer 199, while also abrading off the loose strings and the other particles. The edge brusher device 230 can further include a vacuum nozzle 240 configured to remove air containing debris from the brushing process. It may be appreciated that the edge brusher device 230 can include a single brush wheel 235 configured to rotate in the first direction along the edge of the lens wafer 199 during a first perimeter sweep of the lens wafer 199, then rotate in a second direction along the edge of the lens wafer 199 during a second perimeter sweep of the lens wafer 199, wherein the second direction is opposite the first direction. It may be appreciated that the edge brusher device 230 can include two brush wheels 235, wherein a first brush wheel rotates in the first direction and a second brush wheel rotates in the second direction and only one perimeter sweep of the lens wafer 199 is required to subject the edge of the lens wafer 199 to the brushing effect in both directions. The brush wheel directions may also be modulated. In a useful setting, the brush wheel 235 can rotate at, for example, 20 to 200 RPM, or 30 to 175 RPM, or 40 to 150 RPM, or 50 to 130 RPM, or 60 to 120 RPM.

In a useful arrangement, the first module 105a can include the edge brusher device 230 disposed at a position spaced apart from the burnishing device 205 and the air nozzle 225. For example, the edge brusher device 230 can be disposed adjacent to the burnishing device 205 and the air nozzle 225. In another example, the edge brusher device 230 can be disposed equally spaced along the perimeter of the lens wafer 199 from the burnishing device 205 and the air nozzle 225. Similarly, the edge brusher device 230 can execute the brushing process simultaneously as the burnishing process and the air blow process.

In the first module 205a, the lens wafer 199 rotating clamping cup speed can be adjustable between, for example, one and two revolutions per second by a 360 degree pneumatic rotary actuator with adjustable hard stops, via flow controls. In one example, a pre-peel cycle encompassed by the first module 205a can include two revolutions of the lens wafer 199—one clockwise from a tab on the lens wafer 199 (or any fiduciary marker) to the tab, then back again tab to tab. The lens wafer clamping force may be applied by, for example, spring or pneumatic, which can provide optimal force adjustability and can allow retraction of the spring. A clamping force of 2 to 20 pounds, for example, can be applied.

Vacuum within the clamp cups 215, 200 can also be used to maintain a centered position of the lens wafer 199 once loaded until clamping is achieved. The lens wafer 199 can be presented centered on the clamp cups 215, 200 with the tab in a predetermined position. Vacuum should can be used on the opposite clamp cup to equalize force on each side of the lens wafer 199 so a curvature of the lens wafer 199 does not deform, potentially cracking a center polarized layer of the lens wafer 199. In one example, an O-ring size of #230 can provide a theoretical ⅛ pre-peeled film annulus, resulting in a 4 to 5 millimeter pre-peeled annulus.

In a useful configuration, the burnishing pin 210 mounting can accommodate two ⅛ to ¼ inch range diameter burnishing pins each having separate angle adjustability from 90 degrees (vertical) to 45 degrees. The burnishing pins 210 can be arranged against each other to minimize lens wafer edge area. The air nozzle 225 applying the linear guide burnishing force against the lens wafer edge can have a force sensitivity adjustment down to, for example, one pound but no more than ten pounds.

The horizontal oscillating air blow of the air nozzle 225 can be capable of holding two-3/16 or ¼ diameter metal tubes, one on top of the other, in a single block that has adjustability from horizontal to 35 degrees directed upward at the higher curved lens wafer 199 edges. The tubing ends can be compressed down to a parallel knife opening of, for example, 0.020 inches. A fine air flow adjusting knob as well as a high flow on-off valve can be used to control the pre-peel air blow force. An up and down oscillating speed can be adjustable by a DC motor for up to, for example, 10 cycles per second, with a stroke of, for example, a half an inch. A compact spring loaded eccentric cam driven, plunger or swing arm type oscillator can be applicable. The oscillating air nozzle 225 can be mounted to a similar linear slide as the burnishing pins 210, with the air nozzle 225 next to the burnishing pins 210 in order to maximize the lens wafer 199 perimeter treatment area. The initial start and end point for the air blow can be centered on the tab with burnishing pins 210 next to and against the tab. An adjustable PLC delay after air blow/burnish slide advance and before lens wafer 199 rotation, as well as end of lens wafer 199 rotation and before slide retract, can be available.

Figure 2E:
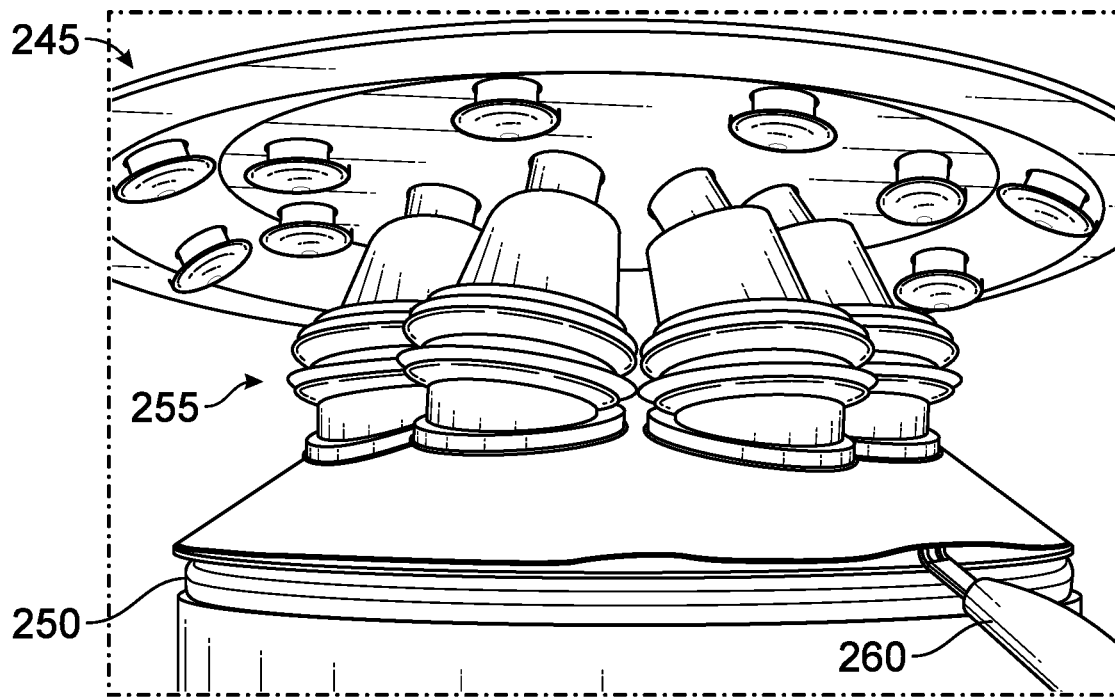
FIG. 2E is a schematic of a peeling device, within the scope of the present disclosure.

FIG. 2E shows an exemplary schematic of an exemplary peeling device 245, useful within the scope of the present disclosure. The second module 105b and the third module 105c can each include one of the peeling device 245, wherein the second module 205b is configured to use the peeling device 245 to peel the first liner from the first surface of the lens wafer 199, and the third module 205c is configured to use the peeling device 245 to peel the second liner from the second surface of the lens wafer 199. The first liner removal/peeling along the first concave surface of the lens wafer 199 includes securing the lens wafer 199 by the second convex surface in a stationary vacuum cup chuck 250 and pulling the first liner off the first concave surface by using at least one suction cup 255 while an oscillating air blast is directed at the lens wafer 199 edge via an air nozzle 260. As shown in FIG. 2D, the third module 205c includes the peeling device 245 for peeling the second liner from the second convex surface of the lens wafer 199. The first concave surface of the lens wafer 199 is secured in the stationary vacuum cup chuck 250 and the second liner is pulled off the second convex surface with the at least one suction cup 255 an oscillating air blast is directed at the lens wafer 199 edge via the air nozzle 260.

The bottom stationary vacuum cup chuck 250 can hold the second convex side of the lens wafer 199 down with the second liner attached, while the first liner is removed with the at least one suction cup 255, wherein the at least one suction cup 255 includes, for example, one, more than one, more than two, more than five, or eight small suction cups angled outward. Although a single air nozzle 260 is described with the peeling device 245, two or four air nozzles 260 can be contemplated. The rotating air blow peels back the first liner. The stationary vacuum cup chuck 250 can use an adjustable and/or compliant center support for the lens wafer 199 so the lens wafer 199 does not deform and collapse from the vacuum force. A slowly advancing annular air knife may also be used to keep the perimeter of the first liner lifted and peeling back without flapping. This would include a linear slide instead of the rotary air nozzle coupling and drive.

The at least one suction cup 255 can be mounted on an adjustable bolt hole circle pattern with single active center shaft cup angle adjuster to allow the at least one suction cup 255 to engage with the lens wafer 199 at variable outward angles, then adjust the at least one suction cup 255 angle more outward prior to pulling the first liner off. Maximum vacuum can be used to ensure possession of the first liner with the small area of the at least one suction cup 255. The at least one suction cup 255 can start retracting slowly with minimal pulling force before the rotating air blow starts rotating. Once rotating, the air blow flow can initiate and increase slowly, then quickly turn off upon the first liner release triggered by the sudden at least one suction cup 255 retraction. This same air flow control would be the same if an annular air knife were used. The at least one suction cup 255 slide can have adequate adjustable hard stop travel in the forward or processing position.

The same tooling and operation as above in the concave peeling occurs but the lens wafer 199 can be flipped over during transfer. The stationary vacuum cup chuck 250 can use the adjustable and/or compliant center support for the lens wafer 199 so the lens wafer 199 does not deform and collapse from the vacuum force. Also, during this operation, the lens wafer 199 is held by an already peeled surface (i.e. the first surface), therefore stationary vacuum cup chuck 250 can have a sealing surface material that does not leave a mark on the lens wafer surface (i.e. the first surface). The second convex surface can be peeled last and face up so the lens wafer 199 can be placed on a conveyor, such as the outfeed mechanism, convex side up. The at least one suction cup 255 slide can have adequate adjustable hard stop travel in the forward or processing position.

In another example, the peeling device 245 can include at least one finger replacing the at least one suction cup 255. The at least one finger can include a sticky surface configured to loosely attach to the liners and curl away from the edge to induce a peeling action of the liner away from the edge and towards the base of the at least one of finger.

The fourth module 105d can include an additional air nozzle configured to blow a gas over the lens wafer 199 to remove any static charge accumulated on the lens wafer 199. It may be appreciated that the fourth module 105 need not be included in the in-line apparatus 100a and the rotary apparatus 100b. Similarly, the first module 105a need not include all of the burnishing device 205, the air nozzle 225, and the edge brusher device 230. For example, the edge brusher device 230 may be excluded and similar peeling results may be achieved.

It may be appreciated that the in-line apparatus 100a and the rotary apparatus 100b need not include one, or more than one, of the modules 105. In a useful configuration, the in-line apparatus 100a and the rotary apparatus 100b can include the first module 105a and the second module 105b, and the second module 105b can be configured to peel one of the first liner on the first surface or the second liner on the second surface. In another useful configuration, the first module 105a and the second module 105b can further include the fourth module 105d configured to blow the gas over the lens wafer 199 to remove the any static charge. In a useful configuration, the in-line apparatus 100a and the rotary apparatus 100b can include the first module 105a and the third module 105c, and the third module 105c can be configured to peel one of the first liner on the first surface or the second liner on the second surface. In another useful configuration, the first module 105a and the third module 105c can further include the fourth module 105d configured to blow the gas over the lens wafer 199 to remove the any static charge.

Additionally, it may be appreciated that the first module 105a need not include one, or more than one, of the burnishing device 205, the air nozzle 225, and the edge brusher device 230. In a useful configuration, the first module 105a includes only the burnishing device 205, or only the air nozzle 225, or only the edge brusher device 230. In a useful configuration, the first module 105a includes the burnishing device 205 and the air nozzle 225. In a useful configuration, the first module 105a includes the burnishing device 205 and the edge brusher device 230. In a useful configuration, the first module 105a includes the air nozzle 225 and the edge brusher device 230.

In a useful arrangement, process setup is performed by placing 8 or 10 of the lens wafers 199 on the in-feed mechanism or ensuring an up stack feeder has an adequate quantity of the lens wafers 199, then selecting a predetermined number of the lens wafers 199 on a selector device, then initiating the consecutive cycling. The in-line apparatus 100a and the rotary apparatus 100b can then process the selected quantity of the lens wafers 199 and subsequently move them to the out-feed mechanism. An operator can individually remove the lens wafers 199 and do a visual inspection before approving and sending the lens wafers 199 to additional processing.

Figure 3:
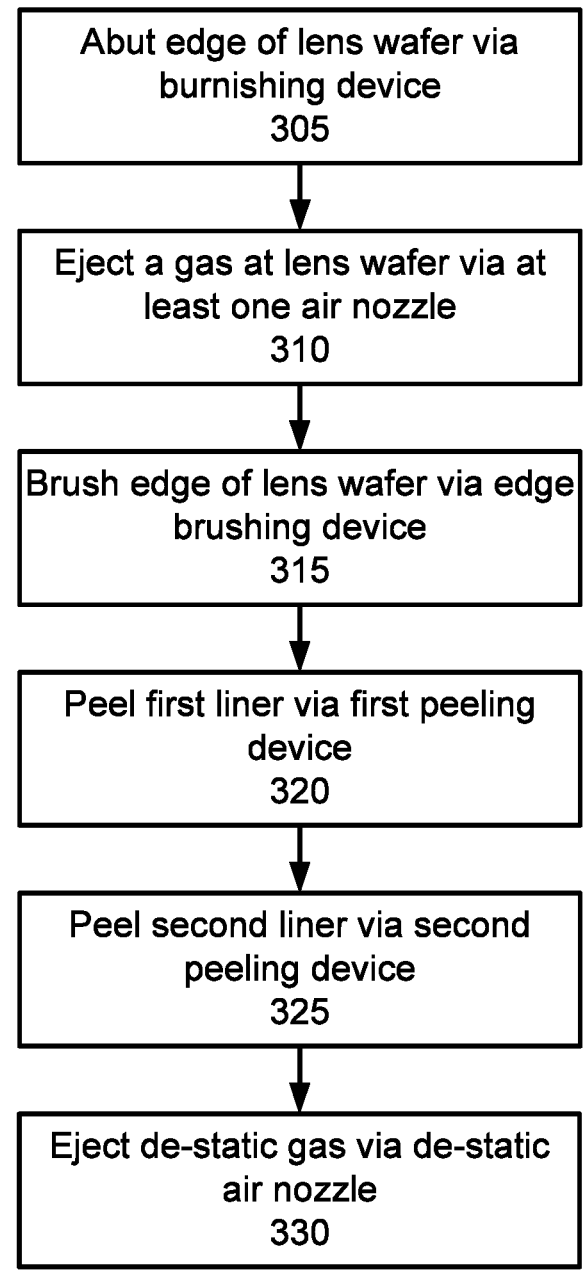
FIG. 3 is a flow chart for a method of peeling and cleaning a lens wafer.

FIG. 3 is a flow chart for a method of peeling and cleaning a lens wafer, useful within the scope of the present disclosure. In step 305, the edge of the lens wafer 199 can be abutted via the burnishing pin 210 of the burnishing device 205. In step 310, the gas can be ejected at the lens wafer via the at least one air nozzle 225. In step 315, the edge of the lens wafer 199 can be brushed via the edge brusher device 230, wherein the brush wheel 235 abuts the edge of the lens wafer 199. In step 320, the first liner can be peeled via the first peeling device 245 in the second module 105b. In step 325, the second liner can be peeled via the second peeling device 245 in the third module 105c. In step 330, the de-static gas can be ejected at the lens wafer 199 via the de-static air nozzle in the fourth module 105d.

EXAMPLES

Example 1—Results for an automatic lens wafer peeling and cleaning apparatus are shown in Table 1.

TABLE 1

| Wafer Base | 1.75 | | 3.00 | | 5.50 | |
|---|---|---|---|---|---|---|
| Wafer Prep | Automatic | Standard | Automatic | Standard | Automatic | Standard |
| Quantity | 520 | 1456 | 524 | 1272 | 565 | 1224 |
| Global Yield | 92.44% | 93.52% | 95.88% | 94.18% | 94.07% | 91.01% |
| Gummies | 0.20% | 0.07% | 0.20% | 1.89% | 0.42% | 0.65% |
| Fibers | 2.72% | 0.68% | 0.00% | 0.79% | 0.31% | 0.89% |
| Surface Specs | 0.59% | 0.41% | 0.20% | 0.39% | 1.24% | 2.22% |
| Scratches | 0.38% | 0.20% | 0.18% | 0.24% | 0.00% | 0.96% |
| Coating Specs | 1.54% | 0.88% | 0.00% | 0.47% | 3.09% | 1.05% |

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than specifically described unless expressly indicated otherwise. Various additional operations may be performed and/or described operations may be omitted.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) An apparatus for separating a first liner from a lens wafer (199), including: at least one air nozzle (225) including a first open end facing an edge of the lens wafer (199) and configured to eject a gas, the at least one air nozzle (225) disposed proximal to a first lens wafer holder (215, 220)

configured to hold the lens wafer (199) having the first liner attached to a first surface of the lens wafer (199); and a first peeling device (245) including a second lens wafer holder (250) configured to hold the lens wafer (199), a first auxiliary air nozzle (260) facing the lens wafer (199) and including a first opening configured to eject a gas, and a first at least one suction cup (255) configured to contact the first liner on the first surface of the lens wafer (199) and form a vacuum seal with the first liner, each suction cup of the first at least one suction cup (255) being retractable in a direction away from the lens wafer (199).

(2) The apparatus of (1), further including: a burnishing device (205) including a burnishing pin (210) configured to abut the edge of the lens wafer (199) and a transfer arm (110*a*) configured to move the lens wafer (199) from the first lens wafer holder (215, 220) to the second lens wafer holder (250).

(3) The apparatus of either (1) or (2), wherein the at least one air nozzle (225) is configured to oscillate along at least one direction perpendicular to a plane of the lens wafer (199).

(4) The apparatus of either (1) or (2), wherein the at least one air nozzle (225) includes a first air nozzle and a second air nozzle, the first air nozzle is oriented at an angle between 15 and 35 degrees above a plane of the lens wafer (199) surface at the edge of the lens wafer (199), and the second air nozzle is oriented at an angle between 15 and 35 degrees below the plane of the lens wafer (199) surface at the edge of the lens wafer (199).

(5) The apparatus of (4), wherein the first air nozzle and the second air nozzle are disposed on opposite sides of the lens wafer (199).

(6) The apparatus of either (4) or (5), wherein the at least one air nozzle (225) further includes a third air nozzle and a fourth air nozzle, the third air nozzle is oriented at an angle between 15 and 35 degrees above the plane of the lens wafer (199) surface at the edge of the lens wafer (199), and the fourth air nozzle is oriented at an angle between 15 and 35 degrees below the plane of the lens wafer (199) surface at the edge of the lens wafer (199).

(7) The apparatus of (6), wherein the first air nozzle and the third air nozzle are disposed on opposite sides of the lens wafer (199), and the second air nozzle and the fourth air nozzle are disposed on opposite sides of the lens wafer (199).

(8) The apparatus of any one of (1) to (7), further including: an edge brusher device (230) disposed proximal to the first lens wafer holder (215, 220), the edge brusher device (230) including at least one brush wheel (235) and a motor configured to rotate the at least one brush wheel (235), the at least one brush wheel (235) configured to abut the edge of the lens wafer (199).

(9) The apparatus of (8), wherein the edge brusher device (230) includes two brush wheels (235), a first brush wheel is configured to rotate in a first direction when abutting the edge of the lens wafer (199), and a second brush wheel is configured to rotate in a second direction opposite the first direction when abutting the edge of the lens wafer (199).

(10) The apparatus of either (8) or (9), wherein the edge brusher device (230) includes a vacuum nozzle (240) configured to extract debris generated by the brush wheel (235) abutting the edge of the lens wafer (199).

(11) The apparatus of any one of (8) to (10), further including: a second peeling device (245) including a third lens wafer holder (250) to hold the lens wafer (199), a second auxiliary air nozzle (260) facing the lens wafer (199) and including a first opening configured to eject a gas, and a second at least one suction cup (255) configured to contact a second liner on a second surface of the lens wafer (199) and form a vacuum seal with the second liner, each suction cup of the second at least one suction cup (255) being retractable in a direction away from the lens wafer (199).

(12) The apparatus of (11), wherein the first at least one suction cup (255) and the second at least one suction cup (255) each include one, more than one, more than two, more than five, or eight suction cups.

(13) The apparatus of any one of (1) to (12), further including: a fourth lens wafer holder (250); and a de-static air nozzle disposed proximal to the fourth lens wafer holder (250) and including a first open end facing the lens wafer (199) and configured to eject a de-static gas, the de-static gas configured to remove a static charge from the lens wafer (199).

(14) The apparatus of either (11) or (12), wherein the first peeling device (245) is configured to remove the first liner from the first surface of the lens wafer, the first surface of the lens wafer being concave, and the second peeling device (245) is configured to remove the second liner from the second surface of the lens wafer (199), the second surface of the lens wafer (199) being convex.

(15) A method of separating a first liner from a lens wafer (199), including: ejecting a gas via at least one air nozzle (225) including a first open end facing an edge of the lens wafer (199), the at least one air nozzle (225) disposed proximal to a first lens wafer holder (215, 220) configured to hold the lens wafer (199) having the first liner attached to a first surface of the lens wafer (199); and peeling the first liner from the surface of the lens wafer (199) via a first peeling device (245) including a second lens wafer holder (215, 220) configured to hold the lens wafer (199), a first auxiliary air nozzle (260) facing the lens wafer (199) and including a first opening configured to eject a gas, and a first at least one suction cup (255) configured to contact the first liner on the first surface of the lens wafer (199) and form a vacuum seal with the first liner, each suction cup of the first at least one suction cup (255) being retractable in a direction away from the lens wafer (199).

(16) The method of (15), further including: abutting the edge of the lens wafer (199) before peeling the first liner via a burnishing device (205) including a burnishing pin (210).

(17) The method of either (15) or (16), wherein the at least one air nozzle (225) is configured to oscillate along at least one direction perpendicular to a plane of the lens wafer (199).

(18) The method of either (15) or (16), wherein the at least one air nozzle (225) includes a first air nozzle and a second air nozzle, the first air nozzle is oriented at an angle between 15 and 35 degrees above a plane of the lens wafer (199) surface at the edge of the lens wafer (199), and the second air nozzle is oriented at an angle between 15 and 35 degrees below the plane of the lens wafer (199) surface at the edge of the lens wafer (199).

(19) The method of (18), wherein the at least one air nozzle (225) further includes a third air nozzle and a fourth air nozzle, the third air nozzle is oriented at an angle between 15 and 35 degrees above the plane of the lens wafer (199) surface at the edge of the lens wafer (199), and the fourth air nozzle is oriented at an angle between 15 and 35 degrees below the plane of the lens wafer (199) surface at the edge of the lens wafer (199).

(20) The method of any one of (15) to (19), further including: brushing the edge of the lens wafer (199) before peeling the first liner via an edge brusher device (230) disposed proximal to the first lens wafer holder (215, 220), the edge brusher device (230) including at least one brush wheel (235) and a motor configured to rotate the at least one brush wheel (235), the at least one brush wheel (235) configured to abut the edge of the lens wafer (199).

(21) The method of any one of (15) to (19), further including: peeling a second liner from a second surface of the lens wafer (199) via a second peeling device (245) including a third lens wafer holder (250) to hold the lens wafer (199), a second auxiliary air nozzle (260) facing the lens wafer (199) and including a first opening configured to eject a gas, and a second at least one suction cup (255) configured to contact the second liner on the second surface of the lens wafer (199) and form a vacuum seal with the second liner, each suction cup of the second at least one suction cup (255) being retractable in a direction away from the lens wafer (199).

(22) The method of any one of (15) to (21), further including: ejecting a de-static gas via a de-static air nozzle disposed proximal to a fourth lens wafer holder (250) and including a first open end facing the lens wafer (199), the de-static gas configured to remove a static charge from the lens wafer (199).

(23) The apparatus of any one of (1) to (14), further including: a lens wafer in-feed mechanism configured to transport the lens wafer (199) to the transfer arm and a lens wafer out-feed mechanism configured to transport the lens wafer (199) away from the transfer arm.

What is claimed is:

1. An apparatus for separating a first liner from a lens wafer, comprising:
    at least one nozzle including a first open end configured to face an edge of the lens wafer and to eject a gas, the at least one nozzle disposed proximal to a first lens wafer holder configured to hold the lens wafer having the first liner attached to a first surface of the lens wafer; and
    a first peeling device including a second lens wafer holder configured to hold the lens wafer, a first auxiliary nozzle configured to face the lens wafer and including a first opening configured to eject a gas, and a first at least one suction cup configured to contact the first liner on the first surface of the lens wafer,
    wherein:
        said at least one nozzle is an air nozzle;
        said first auxiliary nozzle is a first auxiliary air nozzle; and
        said first at least one suction cup is configured to form a vacuum seal with the first liner, each suction cup of the first at least one suction cup being retractable in a direction away from the lens wafer.

2. The apparatus of claim 1, further comprising:
    a burnishing device including a burnishing pin configured to abut the edge of the lens wafer; and
    a transfer arm configured to move the lens wafer from the first lens wafer holder to the second lens wafer holder.

3. The apparatus of claim 1, wherein the at least one air nozzle is configured to oscillate along at least one direction perpendicular to a plane of the lens wafer.

4. The apparatus of claim 1, wherein
    the at least one air nozzle includes a first air nozzle and a second air nozzle;
    the first air nozzle is orientable at an angle between 15 and 35 degrees above a plane of the lens wafer surface at the edge of the lens wafer; and
    the second air nozzle is orientable at an angle between 15 and 35 degrees below the plane of the lens wafer surface at the edge of the lens wafer.

5. The apparatus of claim 4, wherein the first air nozzle and the second air nozzle are disposable on opposite sides of the lens wafer.

6. The apparatus of claim 4, wherein
    the at least one air nozzle further includes a third air nozzle and a fourth air nozzle;
    the third air nozzle is orientable at an angle between 15 and 35 degrees above the plane of the lens wafer surface at the edge of the lens wafer; and
    the fourth air nozzle is orientable at an angle between 15 and 35 degrees below the plane of the lens wafer surface at the edge of the lens wafer.

7. The apparatus of claim 6, wherein the first air nozzle and the third air nozzle are disposable on opposite sides of the lens wafer, and the second air nozzle and the fourth air nozzle are disposed on opposite sides of the lens wafer.

8. The apparatus of claim 1, further comprising: an edge brusher device disposed proximal to the first lens wafer holder, the edge brusher device including at least one brush wheel and a motor configured to rotate the at least one brush wheel, the at least one brush wheel configured to abut the edge of the lens wafer.

9. The apparatus of claim 8, wherein:
    the edge brusher device includes two brush wheels;
    a first brush wheel is configured to rotate in a first direction when abutting the edge of the lens wafer; and
    a second brush wheel is configured to rotate in a second direction opposite the first direction when abutting the edge of the lens wafer.

10. The apparatus of claim 8, wherein the edge brusher device includes a vacuum nozzle configured to extract debris generated by the brush wheel abutting the edge of the lens wafer.

11. The apparatus of claim 8, further comprising: a second peeling device including a third lens wafer holder to hold the lens wafer, a second auxiliary air nozzle configured to face the lens wafer and including a first opening configured to eject a gas, and a second at least one suction cup configured to contact a second liner on a second surface of the lens wafer and form a vacuum seal with the second liner, each suction cup of the second at least one suction cup being retractable in a direction away from the lens wafer.

12. The apparatus of claim 11, wherein the first at least one suction cup and the second at least one suction cup each include more than one suction cup.

13. The apparatus of claim 11, further comprising:
    a fourth lens wafer holder; and
    a de-static air nozzle disposed proximal to the fourth lens wafer holder and including a first open end configured to face the lens wafer and configured to eject a de-static gas, the de-static gas configured to remove a static charge from the lens wafer.

14. The apparatus of claim 11, wherein:
    the first peeling device is configured to remove the first liner from the first surface of the lens wafer, the first surface of the lens wafer being concave; and
    the second peeling device is configured to remove the second liner from the second surface of the lens wafer, the second surface of the lens wafer being convex.

15. A method of separating a first liner from a lens wafer, comprising:
    ejecting a fluid via at least one nozzle including a first open end facing an edge of the lens wafer, the at least one nozzle disposed proximal to a first lens wafer holder configured to hold the lens wafer having the first liner attached to a first surface of the lens wafer; and peeling the first liner from the surface of the lens wafer via a first peeling device including a second lens wafer holder configured to hold the lens wafer, a first auxiliary nozzle facing the lens wafer and including a first opening configured to eject a fluid, and a first at least one suction cup configured to contact the first liner on the first surface of the lens wafer, wherein:
said at least one nozzle is an air nozzle;
said first auxiliary nozzle is a first auxiliary air nozzle;
said fluid is a gas; and
said first at least one suction cup is configured to form a vacuum seal with the first liner, each suction cup of the first at least one suction cup being retractable in a direction away from the lens wafer.

* * * * *